June 9, 1925.
McHENRY ROSS
1,540,955
MACHINE FOR REMOVING HUSKS FROM NUTS
Filed Aug. 20, 1923
3 Sheets-Sheet 1
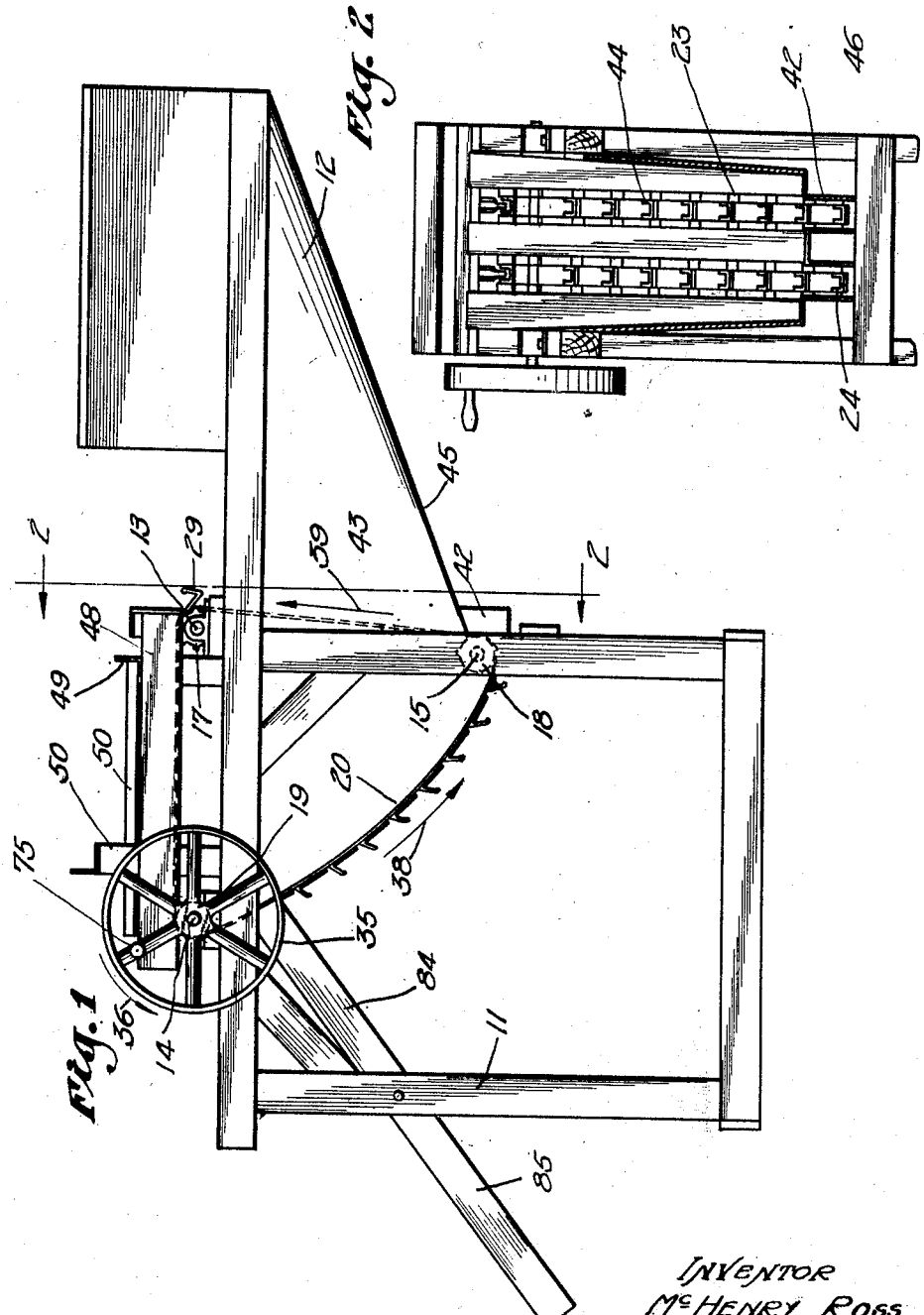
INVENTOR
McHENRY ROSS
BY
Graham + Harris
ATTORNEYS June 9, 1925.
McHENRY ROSS
1,540,955
MACHINE FOR REMOVING HUSKS FROM NUTS
Filed Aug. 20, 1923    3 Sheets-Sheet 2
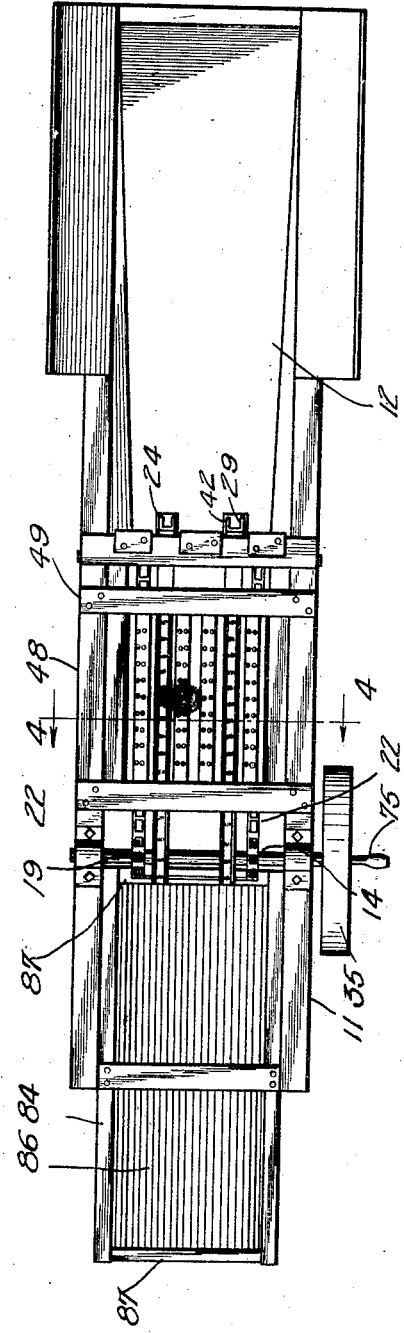
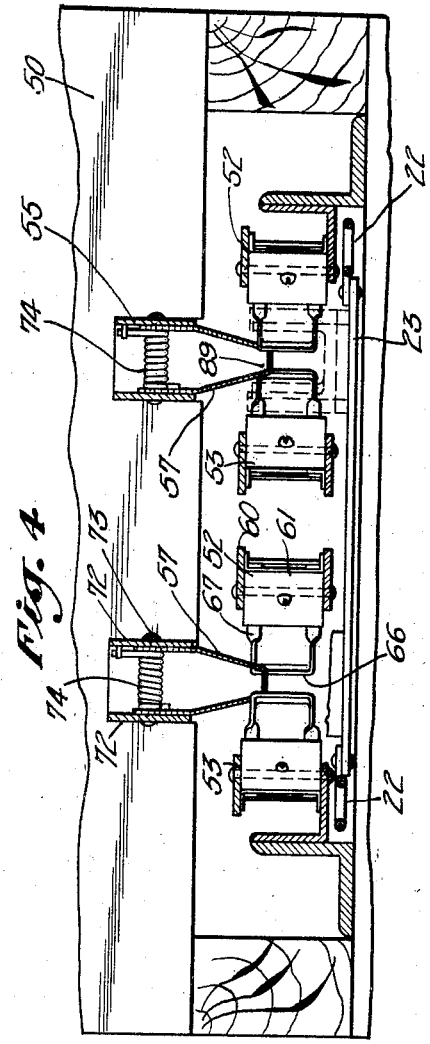
INVENTOR
McHENRY ROSS
BY
Graham + Hurri
ATTORNEYS June 9, 1925.
McHENRY ROSS
MACHINE FOR REMOVING HUSKS FROM NUTS
Filed Aug. 20, 1923
1,540,955
3 Sheets-Sheet 3
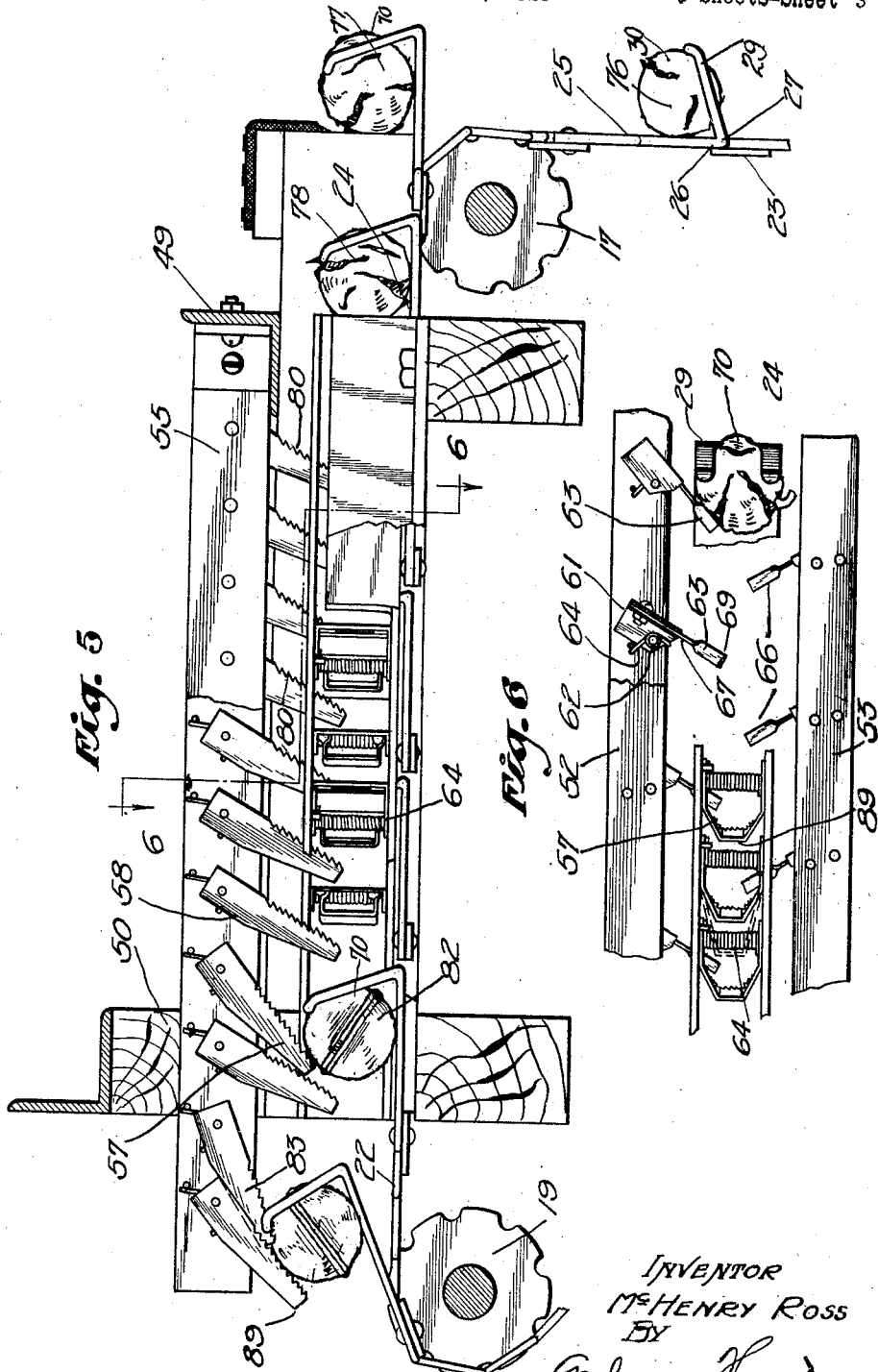
INVENTOR
McHENRY ROSS
BY
Graham + Hunt
ATTORNEYS Patented June 9, 1925.

1,540,955

UNITED STATES PATENT OFFICE.

McHENRY ROSS, OF MONROVIA, CALIFORNIA.

MACHINE FOR REMOVING HUSKS FROM NUTS.

Application filed August 20, 1923. Serial No. 658,341.

*To all whom it may concern:*

Be it known that I, McHENRY ROSS, a citizen of the United States, residing at Monrovia, in the county of Los Angeles, State of California, have invented a new and useful Machine for Removing Husks from Nuts, of which the following is a specification.

My invention relates to husking machines for removing the husks or hulls from nuts which, although of particular utility in the removal of husks from walnuts, may be employed for operation with various other nuts.

Walnuts grow with an outer covering surrounding the shell which is commonly termed a husk or hull. This husk when the nut is immature is in the form of a green covering which protects the nut during its growth, and upon the ripening of the nut dries, and, disassociating itself from the shell of the nut contained therewithin, cracks open in various spots, but does not fall away entirely from the nut, and must be removed when the nuts are harvested. This removal of the husk has been heretofore accomplished manually, and constitutes a tedious and laborious operation as each nut must be handled separately and the husk removed therefrom by the fingers of the husker.

My invention provides a machine which effectually removes the husks from walnuts, and thus eliminates the hereinabove mentioned laborious handling of the nuts. The machine hereinafter described efficiently removes the husks, and, by its use, one operator is enabled to husk a very large quantity of nuts as compared to the husking of the nuts by manual labor.

The advantages and objects of the invention will be made evident hereinafter.

Referring to the drawings, which are for illustrative purposes only,

Fig. 1 is an elevational view of a walnut husking machine embodying the features of my invention.

Fig. 2 is a fragmentary section taken upon a plane represented by the line 2—2 of Fig. 1.

Fig. 3 is a plan view of the machine shown in Fig. 1.

Fig. 4 is a fragmentary section taken on a plane represented by the line 4—4 of Fig. 3, and showing, to enlarged scale, the disposal of the husk removing members.

Fig. 5 is an enlarged fragmentary vertical section illustrating the manner in which the nuts are carried through the battery of husk removing members upon the travelling carrier.

Fig. 6 is a fragmentary plan view taken as indicated by the line 6—6 of Fig. 5.

In the form of my invention shown in the drawings, a frame 11 having a hopper 12 mounted thereupon is employed, this arrangement of frame and hopper being substantially as shown in Fig. 1 of the drawing. Supported upon the frame are shafts 13, 14 and 15 which carry sprockets 17, 18 and 19 over which a continuous traveler 20 is carried. This traveler as shown in Figs. 4 and 5 is conveniently formed of a pair of chains 22 which are spaced apart and have lateral bars 23 connected therebetween at regularly spaced intervals. Upon these bars 23 carriages 24 are mounted. These carriages as shown in Figs. 5 and 6 are each comprised of a flat plate 25 which is riveted at its upper end to one of the cross bars 23 and has the lower end extending down over the succeeding bar 23, as indicated at 26. From the lower end 27 of each plate 25 a pair of diagonally projecting fingers 29 are formed. These fingers 29 are spaced apart in such a manner that a nut may be carried therein as indicated at 30 in Fig. 5.

As shown in Fig. 1, the shafts 13 and 15 are disposed in vertical alignment at the front of the frame 11 and the shaft 14 is located rearwardly and in a horizontal plane, with respect to the shaft 13 so that the traveler 20 may, by rotating the wheel 35 mounted upon the end of the shaft 14 in the direction indicated by the arrow 36, be caused to move through a course in the direction indicated by the arrows 38 and 39 in Fig. 1. Therefore the traveler 20 moves upwardly vertically from the sprockets 18 and passes over the sprocket 17 from whence it then moves rearwardly over the sprockets 19 on the rear shaft 14. The carriages 24 likewise move upwardly through the vertical channels 42, situated at the lower end of the hopper 12, and move vertically through the front end of the hopper as indicated by the dotted lines 43 in Fig. 1 and by the full lines 44 in Fig. 2.

It will be noticed that the bottom 45 of the hopper 12 slopes downwardly toward the vertical channels 42, so that nuts poured into the hopper will run to the lower forward end thereof and will drop into the channels 42. It will be further noticed that the channels 42 are of such length that a carriage 24 is at all times disposed therewithin, and that as each carriage rises from the top of its channel 42, the lower end of the channel will be closed by the succeeding carriage, as indicated at 46 in Fig. 2. By this arrangement, it is possible to direct to the last nut the contents of the hopper onto the travelling carriages 24.

Upon passing over the sprockets 17, the traveler 20 is carried forwardly upon a horizontal plane between the upper side bars 48 which have a forward laterally extending angle 49 mounted thereacross, as indicated in Figs. 1, 3 and 5. Mounted forwardly upon the side bars 48 is a cross bar 50, also shown in Figs. 1 and 5. Upon each side of the courses through which the carriages 24 travel between the sprockets 17 and 19, knife supports are placed as shown in Figs. 3 to 6 inclusive; while directly above the courses of the carriages 24 supports 55 are mounted upon the angle 49 and cross bar 50, which supports carry toothed members 57 which extend downwardly in a diagonal direction as shown at 58 in Fig. 5, into the path of a nut carried on one of the carriages 24. The knife supports 52 and 53 consist of horizontally spaced bars 60 between which knife holders 61 are pivotally mounted upon pins 62. A knife member 63 is mounted in each of the holders 61, and springs 64 as shown in Figs. 5 and 6 are provided for holding the knives 63 resiliently in the path of the nuts carried in the carriages 24.

The knife members 53 are preferably formed from flat steel and are bent to provide vertical knife portions 66 and parallel extending legs 67 which are engaged and secured in the mountings 61. The knife portions 66 are preferably sharpened as indicated at 69 in Fig. 6, and it is also preferable to alternately place the knife mountings 61 as shown in Fig. 6 so that a nut 70 will be engaged upon first one side and then the other by the knives. The toothed members 57 are also formed of flat steel and are pivoted upon the bars 72 forming the supports 55 by means of pins 73 which extend through the bar 72. Springs 74 are also provided for holding the members 57 resiliently in the positions shown at 58 in Fig. 5.

In the operation of the device, the traveler may be caused to move through rotating the shaft 14 by turning the wheel 35, which is accomplished by manually operating a handle 75 mounted upon the wheel, or by a motor and belt, not shown, passing over the wheel 35. As shown in Fig. 5 of the drawing, the nuts are picked up by the carriages 24 and are carried upwardly from the position indicated at 76 and successively through the portions 77 and 78, from whence they are carried between the knife members 63 and beneath the toothed members 57. As shown in Figs. 5 and 6, the nuts are enclosed in husks which are dried and split open in various places but are nevertheless sufficiently integral to prevent their removal from the nut without the expenditure of some force in breaking them apart.

As shown at 70 in Fig. 6, the nuts as they travel between the knives 63 are engaged alternately upon each side by the sharpened knife portions 66 which engage the husks and enter the cracks therein, thus causing the husks to be pulled from the nuts as they advance rearwardly. At the same time, the nuts are engaged by the toothed members 57, the teeth 80 of which engage the husks and accomplish a tearing action thereupon which accomplishes a further removal and also a turning of the nut in the carriage so that different portions thereof are engaged by the members 63 and 67, as the nut travels rearwardly. By the time each nut reaches the rear end of the course, the husk has been removed therefrom, as shown at 82 in Fig. 5. The nut shown at 82, even though the husk has been removed therefrom, is still subject to engagement by members 57 as indicated at 83. This engagement, though ordinarily unnecessary, serves as an assurance that the husk will be entirely removed before the nut is dumped from the carriage onto a screen 84, shown in Figs. 1 and 3.

This screen 84 consists of a frame 85 having longitudinal rods 86 extending between the ends 87 thereof. These rods 86 are spaced apart at such a distance that a walnut will not pass therebetween but will roll therealong into a receptacle placed beneath the lower end thereof, but any husks which may be carried forward by the traveller 20 will pass through the bars 86 and will therefore not be carried into the nut receptacle. As shown particularly in Figs. 4 and 6, the members 57 converge toward their lower ends 89 so that as they are raised by the nuts as shown at 83, each member 57 may pass up between the sides of the succeeding member 57, therefore providing a continuous engagement of the nut with a toothed member as it is carried along. The turning action resulting from the employment of the toothed members 57, and from the alternate spacing of the knives 63, results in the efficient removal of the husk.

I claim as my invention:

1. In a husk remover of the class described, the combination of: husk removing members disposed along a course; means for carrying nuts through said course in such a manner that said nuts will be engaged by said husk removing members; and means for turning said nuts as they are conducted along said course so that the various portions of said nuts will be engaged by said husk removing members.

2. In a husk remover of the class described, the combination of: husk removing members resiliently disposed along a course; means for carrying nuts through said course in such a manner that said nuts will be engaged by said husk removing members; and resiliently disposed means for turning said nuts as they are conducted along said course.

3. In a husk remover of the class described, the combination of: a supporting structure; a hopper; a traveller passing through said hopper; carriages upon said traveller adapted to pick up nuts from said hopper and to discharge them at a point outside said hopper; and husk removing members disposed to engage said nuts as they are carried from said hopper to said point of discharge.

4. In a husk remover of the class described, the combination of: a supporting structure; a hopper; a traveller passing through said hopper; carriages upon said traveller adapted to pick up nuts from said hopper and to discharge them at a point outside said hopper; husk removing members disposed to engage said nuts as they are carried from said hopper to said point of discharge; and means for turning said nuts while being carried by said carriages.

5. In a husk remover of the class described, the combination of: a supporting structure; a hopper; a traveller passing through said hopper; carriages upon said traveller adapted to pick up nuts from said hopper and to discharge them at a point outside said hopper; resiliently supported husk removing members disposed to engage said nuts as they are carried from said said hopper to said point of discharge; and means for turning said nuts while being carried by said carriages.

6. In a husk remover of the class described, the combination of: a supporting structure; a hopper; a traveller passing through said hopper; carriages upon said traveller adapted to pick up nuts from said hopper and to discharge them at a point outside said hopper; knife members supported upon structure for engaging said nuts as they are carried by said carriages to said point of discharge; and means for turning said nuts while being carried by said carriages.

7. In a husk remover of the class described, the combination of: a supporting structure; a hopper; a traveller passing through said hopper; carriages upon said traveller adapted to pick up nuts from said hopper and to discharge them at a point outside said hopper; knife members supported in rows upon each side of the course travelled by said carriages from said hopper to said point of discharge, for engaging and removing the husks from said nuts; and means for turning said nuts while being carried by said carriages.

8. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported upon structure for engaging said nuts as they are carried by said carriage to said point of discharge; and means for turning said nuts while being carried by said carriages.

9. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts; and means for turning said nuts while being carried by said carriages.

10. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts; and toothed members mounted above said course and extending downwardly in a manner to engage said nuts carried by said carriages.

11. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts; and toothed members mounted above said course and extending downwardly in a manner to engage and turn said nuts carried by said carriages.

12. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts; and toothed members resiliently mounted above said course and extending downwardly in a manner to engage and turn said nuts carried by said carriages.

13. In a husk remover of the class described, the combination of: a supporting structure; a hopper; a traveller passing through said hopper; carriages upon said traveller adapted to pick up nuts from said hopper and to discharge them at a point outside said hopper; knife members supported in rows upon each side of the course travelled by said carriages from said hopper to said point of discharge, for engaging and removing the husks from said nuts, said rows of knives being offset one from the other in order that said nuts will be alternately engaged first on one side and then the opposite side; and means for turning said nuts while being carried by said carriages.

14. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts, said rows of knives being offset one from the other in order that said nuts will be alternately engaged first on one side and then the opposite side; and tooth members resiliently mounted above said course and extending downwardly in a manner to engage and turn said nuts carried by said carriages.

15. In a husk remover of the class described, the combination of: a supporting structure; a hopper; a traveller passing through said hopper; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts, said rows of knives being offset one from the other in order that said nuts will be alternately engaged first on one side and then the opposite side; tooth members resiliently mounted above said course and extending downwardly in a manner to engage and turn said nuts carried by said carriages; and a screen supported upon said structure for receiving said nuts as they are discharged from said carriages.

16. In a husk remover of the class described, the combination of: a supporting structure; a hopper; a traveller passing through said hopper; means for moving said traveller; carriages upon said traveller adapted to pick up nuts from said hopper and to discharge them at a point outside said hopper; knife members resiliently supported in rows upon each side of the course travelled by said carriages from said hopper to said point of discharge, for engaging and removing the husks from said nuts, said rows of knives being offset one from the other in order that said nuts will be alternately engaged first on one side and then the opposite side; tooth members resiliently mounted above said course and extending downwardly in a manner to engage and turn said nuts carried by said carriages; and a screen supported upon said structure for receiving said nuts as they are discharged from said carriages.

In testimony whereof, I have hereunto set my hand at Los Angeles, California, this 2nd day of August, 1923.

McHENRY ROSS.